United States Patent [19]
Kanai

[11] Patent Number: 4,851,975
[45] Date of Patent: Jul. 25, 1989

[54] ILLUMINATION DEVICE

[75] Inventor: Nobuo Kanai, Osaka, Japan

[73] Assignee: Minolta Camera Kabushiki Kaisha, Osaka, Japan

[21] Appl. No.: 250,421

[22] Filed: Sep. 28, 1988

[30] Foreign Application Priority Data

Sep. 29, 1987 [JP] Japan .................... 62-245286

[51] Int. Cl.$^4$ ............................................. G03B 27/54
[52] U.S. Cl. ..................... 362/217; 362/297; 362/301; 362/346; 355/67
[58] Field of Search ............... 362/217, 297, 298, 301, 362/346, 347, 348

[56] References Cited

U.S. PATENT DOCUMENTS

| | | | |
|---|---|---|---|
| 3,982,116 | 9/1976 | Sakuma | 355/67 |
| 4,295,186 | 10/1981 | Sugiura et al. | 355/67 |
| 4,375,331 | 3/1983 | Tohyama et al. | 355/67 |
| 4,518,249 | 5/1985 | Murata et al. | 355/67 |
| 4,733,280 | 3/1988 | Izie | 355/67 |

FOREIGN PATENT DOCUMENTS 56-74274 6/1981 Japan .
60-15052 4/1985 Japan .

*Primary Examiner*—Ira S. Lazarus
*Assistant Examiner*—Richard R. Cole
*Attorney, Agent, or Firm*—Price, Gess & Ubell

[57] ABSTRACT

An illumination device for use in a slit exposure system for illuminating a document located on a document table. The illumination device has a light source with an elongated shape and a reflector surrounding a portion of the periphery of the light source and designed to reflect a light emitted from the light source toward the document. The reflector has a plurality of cylindrical reflecting surfaces. Each of the surfaces is designed to reflect while collimating a light virtually emitted from a linear area to be illuminated on the document table toward the light source, assuming that a line from which the light is emitted is located on the linear area.

7 Claims, 3 Drawing Sheets

ILLUMINATION DEVICE

BACKGROUND OF THE INVENTION

1. FIELD OF THE INVENTION

The present invention relates to an illumination device for use in a slit exposure system of an image reader, electrophotographic copying machine or the like.

2. DESCRIPTION OF THE PRIOR ART

Generally, an image reader, electrophotographic copying machine or the like employs a tube-type light source having a filament suspended centrally thereof, the light source being surrounded by a converging type reflecting mirror. In operation, light emitted from the light source is reflected and converged by the mirror to illuminate an original document on a document table, and image information of the document is obtained from the light reflected by the same. Therefore, for obtaining accurate document image information, it is essential that the object portion of the document (the portion to be illuminated) be illuminated stably with sufficient illuminance.

In the actual devices of the above-noted type; however, there tends to occur an inconvenience in that such stable and sufficient illuminance is unobtainable due to inaccuracy in positioning of the filament attributable to attaching error of the light source or assembly error of the entire illumination device. Such positioning inaccuracy of the filament or inadvertent displacement of the same from its designed proper position leads to disadvantageous fluctuations or variations in the illuminance and consequently in the amount of light applied to the object document portion.

Especially, the above-described problem is serious in the case of the image reader, where image pickup elements for receiving the reflected light from the illuminated document are arrayed one-dimensionally with each element having a light-receiving portion of only 7 μm width, which width yet corresponds to as much as 0.1 mm width in the illuminated document portion. That is to say, even a slight illuminance fluctuation or variation at the illuminated document portion due to the displacement of a filament may considerably affect accuracy of the obtained image information.

A Japanese laid-open patent application No. 56-74274 discloses an illumination device having a main reflecting mirror constituted by a plurality of oval surfaces and an auxiliary reflecting mirror constituted by a single flat surface. However, this device suffers from the same problem as described above. That is, in the disclosed device, since luminous flux emitted from a light source disposed at a first focal point common to the respective oval surfaces thereof is converged at its second focal point, even a slight displacement of the light source from the common first focal point may result in instability of illuminance applied to the object document portion.

A further reference, Japanese published patent application No. 60-15052 discloses another type of illumination device having a reflecting mirror constituted by a plurality of flat surface portions extending in the direction of an axis of its light source. However, this device has the disadvantage of insufficient light amount applied to the document portion because the respective flat surface portions provide no converging effect to the light emitted from the light source.

SUMMARY OF THE INVENTION

In view of the above-described state of the art, in an illumination device for use in a slit exposure system for illuminating an original document on a document table, the primary object of the present invention is to overcome the shortcomings of the prior art devices by providing an improved device of the above-noted type capable of providing an object document portion to be illuminated with stable luminance regardless of displacement to a certain extent of its light source and sufficient light amount as well.

The foregoing object is accomplished in one preferred embodiment by providing an illumination device having: a light source with an elongated shape; and a reflector surrounding a portion of the periphery of the light source for reflecting a light emitted from the light source toward the document, the reflector having a plurality of cylindrical reflecting surfaces, each surface being designed so as to reflect while collimating light components virtually emitted from a linear area to be illuminated on the document table toward the light source, assuming that a line from which the light is emitted is located on the linear area.

As may be apparent from the above description, according to the illumination device of the present invention, even if the light source is displaced from its designed proper position within a predetermined range, e.g. a range corresponding to a width of the parallel luminous flux, the light emitted therefrom may be advantageously converged approximately at the object document portion. As the result, there occurs less variation in the illuminance at the document portion, and consequently it becomes possible to efficiently obtain a sufficient amount of light even from a low-power light source.

Especially, in an image reader having a one-dimensionally arrayed image pickup elements, it becomes possible to obtain a more sufficient illumination with a low-power light source than the aforementioned prior art.

According to a further embodiment of this invention, the illumination device further comprises an auxiliary reflector located at a position opposite to the main reflector with respect to a path of light reflected from the document, and the main reflector has a first group of cylindrical reflecting surfaces for directly reflecting the light from the light source toward the document and a second group of cylindrical reflecting surfaces for reflecting the light from the light source toward the auxiliary reflector through which the light reaches the document.

This construction has an advantage of permitting much greater flexibility in the arrangement of the device.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

A. Construction of Illumination Device

Preferred embodiments of an illumination device related to the present invention will be particularly described next with reference to the accompanying drawings.

Figure 1:
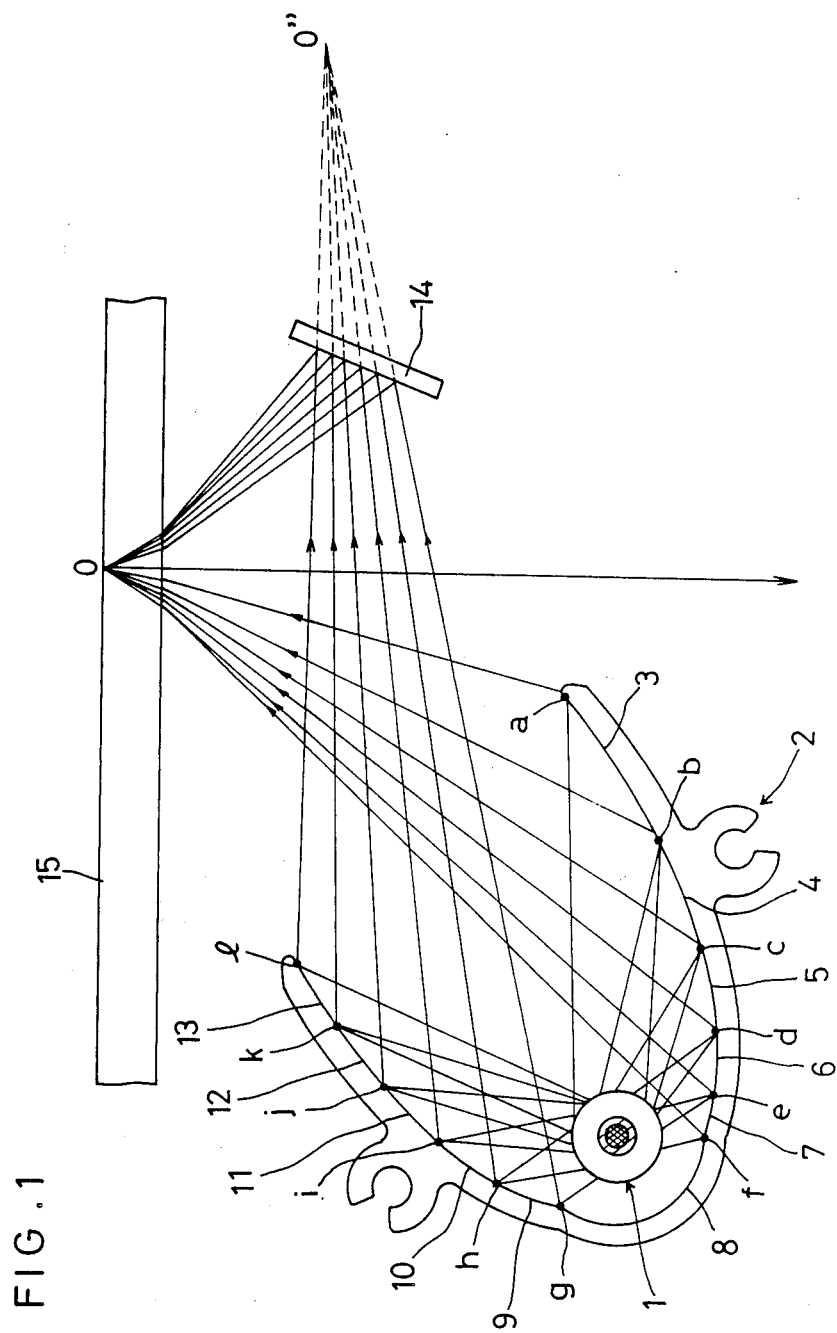
FIG. 1 is a section view of an illumination device related to the present invention.

FIG. 1 is a section view of the illumination device of the invention; in which, reference numeral 1 denotes a halogen lamp as a tube-shaped light source, numeral 2 denotes a main reflector, numeral 14 denotes an auxiliary reflecting mirror, and numeral 15 denotes a document table, respectively.

The reflecting mirror 2 includes an array of a plurality of reflecting surfaces 3 through 13 partially cylindrical in section extending in the direction of an axis of the light source 1. The reflecting surfaces 3 through 7, as will be more particularly described later, are so defined as to reflect components of a light virtually emitted from an illumination-object position 0 of the document table 15 as a substantially parallel luminous flux. The reflecting surfaces 9 through 13 are so defined as to reflect other components of the virtual light from the illumination-object position 0 as a substantially parallel luminous flux through the auxiliary reflecting mirror to the light source 1. It is also to be noted that the parallel luminous flux reflected from the reflecting surfaces 3 through 7 and that reflected from the surfaces 9 through 13 are so designed as to have substantially the same width. The remaining reflecting surface 8 comprises a partially cylindrical face centering about the light source 1 for reflecting other components of the light emitted from the light source 1 back to the same. Incidentally, reference characters a through l represent as points border lines between the respective reflecting surfaces 3 through 13.

B. Designing of Reflector Mirror

Next, designing of the reflecting mirror 2 will be particularly described.

Figure 2:
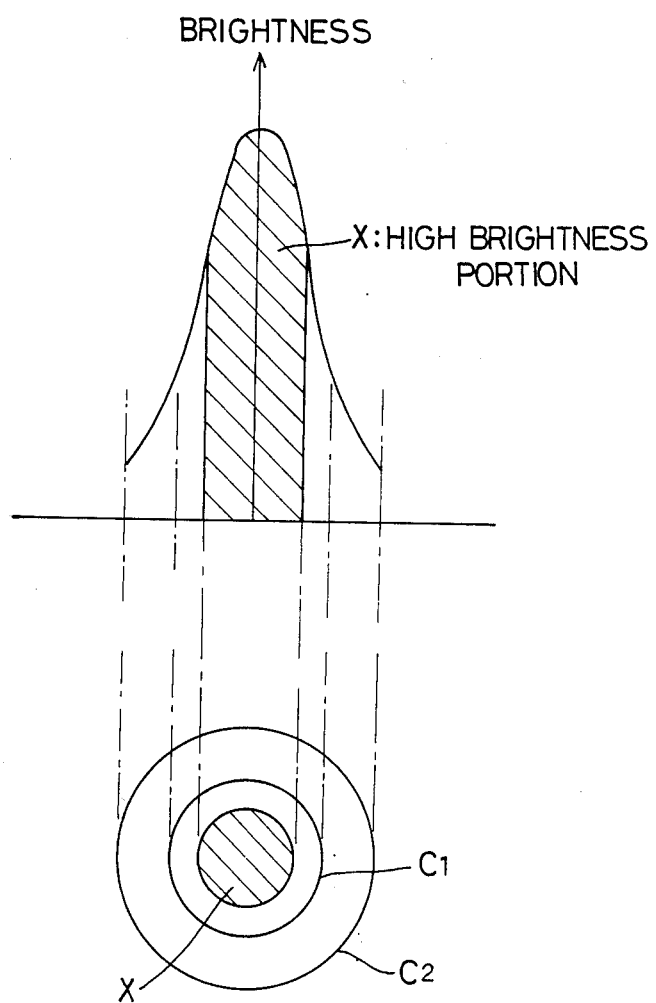
FIG. 2 illustrates brightness distribution of a light source.

(i) Determination of width of parallel luminous flux) (see FIG. 2);

The light source 1 has such brightness distribution characteristics as schematically illustrated in FIG. 2. In this brightness distribution, a high brightness portion X is defined as a region within a predetermined width across a center of brightness. Then, a parallel luminous circle C1 is determined considering the above high brightness portion X and possible eccentricity tolerance of the filament. Incidentally, the dimension of the high brightness portion X is predetermined in accordance with an amount of diffusing luminous flux radiated omnidirectionally from the filament and from gas surrounding the same. Thus determined parallel luminous circle C1 preferably has a diameter ranging between 2 and 4 mm. Reference character C2 denotes an outer diameter of the light source 1.

(ii) Defining of reflecting surfaces 3 through 13 (see FIG. 3):

First, a circle C3 is plotted with a predetermined radius from the center of the light source 1 to define the further reflecting surface 8 for reflecting some of the components of the light from the light source 1 back to the same. The radius of this circle 3 is preferably between 5 and 7 mm.

Next, a base point O' corresponding to an illumination-object position O is determined with consideration to a reflecting ratio of the glass document table 15. From this base point O', a tangent line is plotted to the circle C2, and an intersection of extension of this tangent line with the circle C3 is determined as a point P1, from which a further tangent line l1 is plotted to the parallel luminous circle C1.

Figure 3:
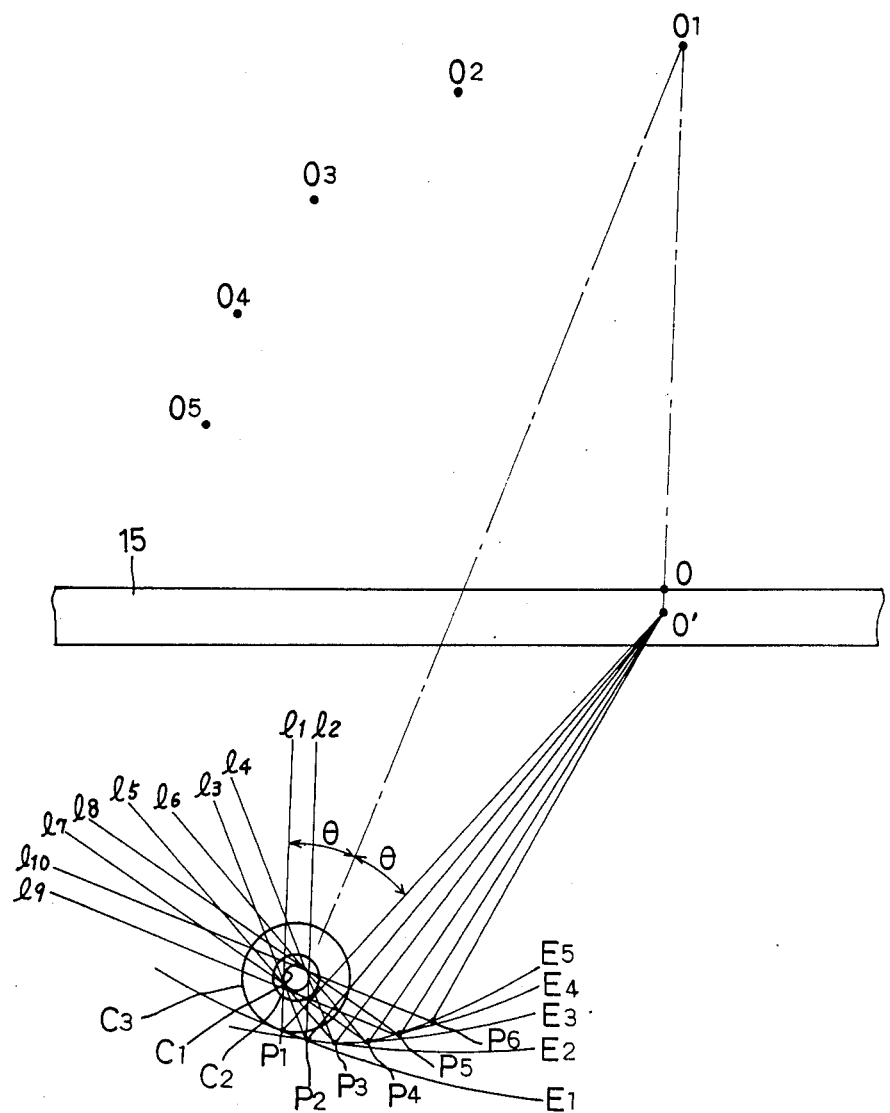
FIG. 3 illustrates a method of defining a plurality of reflecting surfaces.

Then, a bisector line is plotted between the tangent line l1 and the line $\overline{P1\,O'}$ (indicated by an alternate long and short dash line in FIG. 3). On the extension of the above bisector line, a point represented by a $2 \cdot \overline{P1\,O'} \cdot \cos\theta$ from the point P1 is determined as a point O1 ($\overline{O'P} = \overline{O'O1}$), about which a circle E1 having O1 P1 as its radius is plotted.

A further tangent line l2 in parallel with the tangent line l1 is plotted to the parallel luminous circle C1, and an intersection between this tangent line l2 and the circle E1 is determined as a point P2, thereby defining an arc $\overparen{P1\,P2}$ connecting between the point P1 and point P2.

Next, from the point P2, a tangent line l3 is plotted to the parallel luminous circle C1, and a line is plotted between the point P2 and the base point O'; then in the same manner as employed for determining the center point O1, a center point O2 represented by an expression: $\overline{O'O2} = \overline{O'P1}$ is determined on a bisector between the tangent line l3 and the line $\overline{P2O'}$.

In succession, a circle E2 passing the point P2 is plotted about the center O2, and a tangent line l4 in parallel with the tangent line l3 is plotted to the parallel luminous circle C1, and an intersection between this tangent line l4 and the circle E2 is determined as a point P3, thereby defining an arc $\overparen{P2\,P3}$.

By repeating the above procedures, there are determined or defined further tangent lines l5 through l10 and center points O3 through O5 and circles E3 through E5 and consequently arcs $\overparen{P3\,P4}$, $\overparen{P4\,P5}$ and $\overparen{P5\,P6}$, which arcs define the reflecting surfaces.

Therefore, with the reflecting surfaces defined by the arcs $\overparen{P1\,P2}$ through $\overparen{P5\,P6}$, the virtual light components incident on the arcs P1 P2 through P5 P6 are reflected towards the light source 1 as a parallel luminous flux of a width which is the same as the diameter of the parallel luminous circle C1.

Conversely, when parallel light components of the light emitted from the high brightness portion X of the light source 1 are reflected by the above arcs $\overparen{P1\,P2}$ through $\overparen{P5\,P6}$, these light components are converged at the base point O'; whereas, those light components reflected by the circle C3 are returned by reflection to the light source 1.

The circle C3, arcs $\overparen{P1\,P2}$ through $\overparen{P5\,P6}$ thus defined correspond to the reflecting surface 8 and reflecting surfaces 3 through 7, respectively.

The other reflecting surfaces 9 through 13 are defined by the same method as above except that these surfaces are defined based on a base point O'' rather than the foregoing base point O'.

C. Illumination Effect

According to the above-described construction, of the light emitted from the high brightness portion X, the light components in parallel with the tangent lines l1, l3, l5, l7 and l9 are respectively reflected by the reflecting surfaces 3 through 7 to be converged at the illumination-object document position O on the document table 15. Similarly, the light components reflected by the reflecting surfaces 9 through 13 are re-reflected by the auxiliary reflecting mirror 14 to be converged at the position O as well.

As the result, even if the high brightness portion X is displaced from its designed proper position due to displacement of filament, as long as this high brightness portion X is located within the parallel luminous circle C1, the parallel light components will be always converged substantially at the illumination-object document position O, whereby there occurs little variation or fluctuation in the illuminance at this position.

Further, the light components reflected by the reflecting surface 8 are returned to the light source 1 thereby enhancing the source brightness and improving the illumination efficiency advantageously.

What is claimed is:

1. An illumination device for use in a slit exposure system for illuminating a document located on a document table, the illumination device comprising:
    a light source with an elongated shape; and
    a reflector surrounding a portion of the periphery of said light source for reflecting a light emitted from the light source toward a document, said reflector having a plurality of cylindrical reflecting surfaces being designed to reflect while collimating light components that are virtually emitted from a linear area to be illuminated on the document table toward said light source, whereby a line from which said light is virtually emitted is located on the linear area.

2. An illumination device as claimed in claim 1, further comprising:
    an auxiliary reflector located at a position opposite to the reflector with respect to a path of light reflected from the document; wherein said reflecting surfaces include a first group of cylindrical reflecting surfaces for directly reflecting the light from said light source toward the document and a second group of cylindrical reflecting surfaces for reflecting the light from said light source toward said auxiliary reflector through which the light reaches the document.

3. An illumination device as claimed in claim 2, wherein said reflector further includes a further cylindrical reflecting surface located behind said light source for returning the light to said light source.

4. An illumination device for use in a slit exposure system for illuminating a document located on a document table, the illumination device comprising:
    a light source with an elongated shape, said light source having a high brightness portion with a certain diameter along an axis thereof; and
    a reflector surrounding a portion of the periphery of said light source for reflecting a light emitted from said light source toward a document, said reflector having a plurality of cylindrical reflecting surfaces designed to condense a parallel luminous flux emitted from said high brightness portion of said light source onto a linear area to be illuminated on the document table whenever said high brightness portion is positioned within a deviation range having a diameter exceeding that of said high brightness portion.

5. An illumination device as claimed in claim 4, further comprising:
    a auxiliary reflector located at a position opposite to said reflector with respect to a path of light reflected from the document; wherein said reflecting surfaces include a first group of cylindrical reflecting surfaces designed to directly reflect the light from said light source toward the document and a second group of cylindrical reflecting surfaces designed to reflect the light from said light source toward said auxiliary reflector through which the light reaches the document.

6. An illumination device as claimed in claim 5, wherein said reflecting surfaces include a further reflecting surface located behind said light source and designed to return the light to said high brightness portion of said light source.

7. An illumination device for use in a slit exposure system for illuminating a document located on a document table, the illumination device comprising:
    a light source with an elongated shape, said light source having a high brightness portion with a certain diameter along an axis thereof;
    a main reflector surrounding a portion of the periphery of said light source for reflecting a light emitted from said light source toward the document; and
    an auxiliary reflector located at a position opposite to said main reflector with respect to a path of light reflected from said main reflector toward the document;
    said main reflector including,
        a first group of cylindrical reflecting surfaces each designed to directly reflect the light emitted from said light source toward the document while condensing a parallel luminous flux emitted from said high brightness portion onto a linear area to be illuminated on the document table whenever said high brightness portion is positioned within a deviation range having a diameter exceeding that of said high brightness portion,
        a second group of cylindrical reflecting surfaces each reflecting the light emitted from said light source toward said auxiliary reflector while condensing a parallel luminous flux emitted from said high brightness portion onto said linear area whenever said high brightness portion is positioned within said deviation range, and
        a further cylindrical reflecting surface located behind said light source for returning the light to said high brightness portion of said light source.

* * * * *